June 25, 1957 M. S. GLASS 2,797,361

MAGNETRONS

Filed April 13, 1953 2 Sheets-Sheet 1

INVENTOR
M. S. GLASS
BY [signature]
ATTORNEY

CAVITIES 13 ENLARGED DIAMETER
PINS 18 REDUCED DIAMETER

INVENTOR
M. S. GLASS
BY James Falk
ATTORNEY

United States Patent Office 2,797,361

Patented June 25, 1957

2,797,361

MAGNETRONS

Myron S. Glass, West Orange, N. J., assignor to Bell Telephone Laboratories, Incorporated, New York, N. Y., a corporation of New York Application April 13, 1953, Serial No. 348,365

7 Claims. (Cl. 315—39.65)

This invention relates to magnetrons and more particularly to the cancellation of the variations with frequency of the reactance introduced by the transformer output in tunable magnetrons.

In certain types of magnetrons, such as described in Patent 2,657,334, issued October 27, 1953, of J. W. West, the operating frequency of the magnetron is varied by introducing tuning pins into each of the resonator bores. These tuning pins have in the past been all of the same dimensions to achieve equal tuning of each resonator bore. However, due to the presence of the output transformer, which is coupled to one of the resonator bores, a variable reactance is introduced as the operating frequency is changed. This transformer reactance variation may adversely affect the operation of the tube. Particularly, this variation may impair the equalization of the loading of the components of modes other than the main mode of oscillation.

In an application Serial No. 348,438, filed April 13, 1953, of R. C. Fletcher and S. Millman, there is described a novel magnetron resonator structure wherein "moding" is prevented by assuring that the doublet components of the mode of oscillation closest in frequency to the main or $\pi$-mode are equally loaded. "Moding," as described further in the Fletcher-Millman application, occurs when a magnetron oscillates in other than the desired mode so that no line appears in the slot assigned to that particular pulse in the spectrum of the main mode. It has been found, however, that the frequency variable transformer reactance prevents the loads on the doublet components from being substantially equal over the entire tuning range.

It is an object of this invention to compensate for the variable reactance introduced by the output transformer in a tuned magnetron.

It is another object of this invention further to inhibit moding by assuring that the components of modes other than the desired mode of oscillation are equally loaded over the entire tuning range.

It is a further general object of this invention to provide an improved magnetron.

As disclosed in application Serial No. 348,526, filed April 13, 1953, of M. S. Glass and L. R. Walker, the effect of a reactive disturbance introduced into a resonant circuit can be cancelled by the introduction of another reactive disturbance of like sign and magnitude at a point 90 degrees removed from the unwanted reactive disturbance. In accordance with the present invention, the objects mentioned above and various other objects are attained in one specific embodiment by reducing the diameter of the tuning pins insertable into the resonator bores 90 degrees removed from the output resonator. The inductance presented by the output transformer increases as the frequency of operation of the magnetron is increased, while the inductance of each resonator is decreased by insertion of the tuning pins. In accordance with this invention, the decrease in inductance of at least one resonator substantially 90 degrees removed from the output resonator in the circular array of resonators, and, therefore, the rate of tuning in this resonator, is reduced to an amount sufficient to compensate for the slow rate of decrease of the output resonator due to the variable inductance of the output transformer; this is attained by decreasing the diameter of the tuning pin in this resonator.

While the frequency variable reactance introduced into the resonant system by the output configuration can be compensated for by decreasing the dimensions of a tuning pin in but one resonator bore approximately 90 degrees removed from the output resonator, advantageously the tuning pins in both resonators approximately 90 degrees from the output resonator are of reduced dimensions so that too big a discontinuity in the tuning system is not introduced into one resonator, as further discussed in the above-mentioned Glass-Walker application.

It is, therefore, a feature of this invention that the tuning pin insertable into at least one of the resonant cavities substantially 90 degrees removed from the output cavity of a resonant circuit having a plurality of resonant cavities arranged in a circular array be of smaller diameter than the other tuning pins to compensate for the frequency variable reactance introduced in the output cavity by the means utilized for transferring energy from the resonant circuit.

It is a further feature of this invention that the tuning pins insertable into both resonant cavities removed substantially 90 degrees from the output cavity be of reduced diameter so that the correction effected thereby in any one cavity not be so large as to be disruptive of the resonant circuit.

It is a still further feature of this invention that the tuning pins insertable into the resonator bores of a magnetron substantially 90 degrees removed from the resonator bore with which an output impedance transformer wave guide section is associated be of reduced diameter to attain compensation for the frequency variations in the reactance of the transformer section and thus substantially equal loading of the doublet components of a mode of oscillation of the magnetron that it is desired to suppress over the entire range of operation of the magnetron.

A complete understanding of this invention and of the various features thereof may be gained from consideration of the following detailed description and the accompanying drawing, in which.

Figures 1, 4:
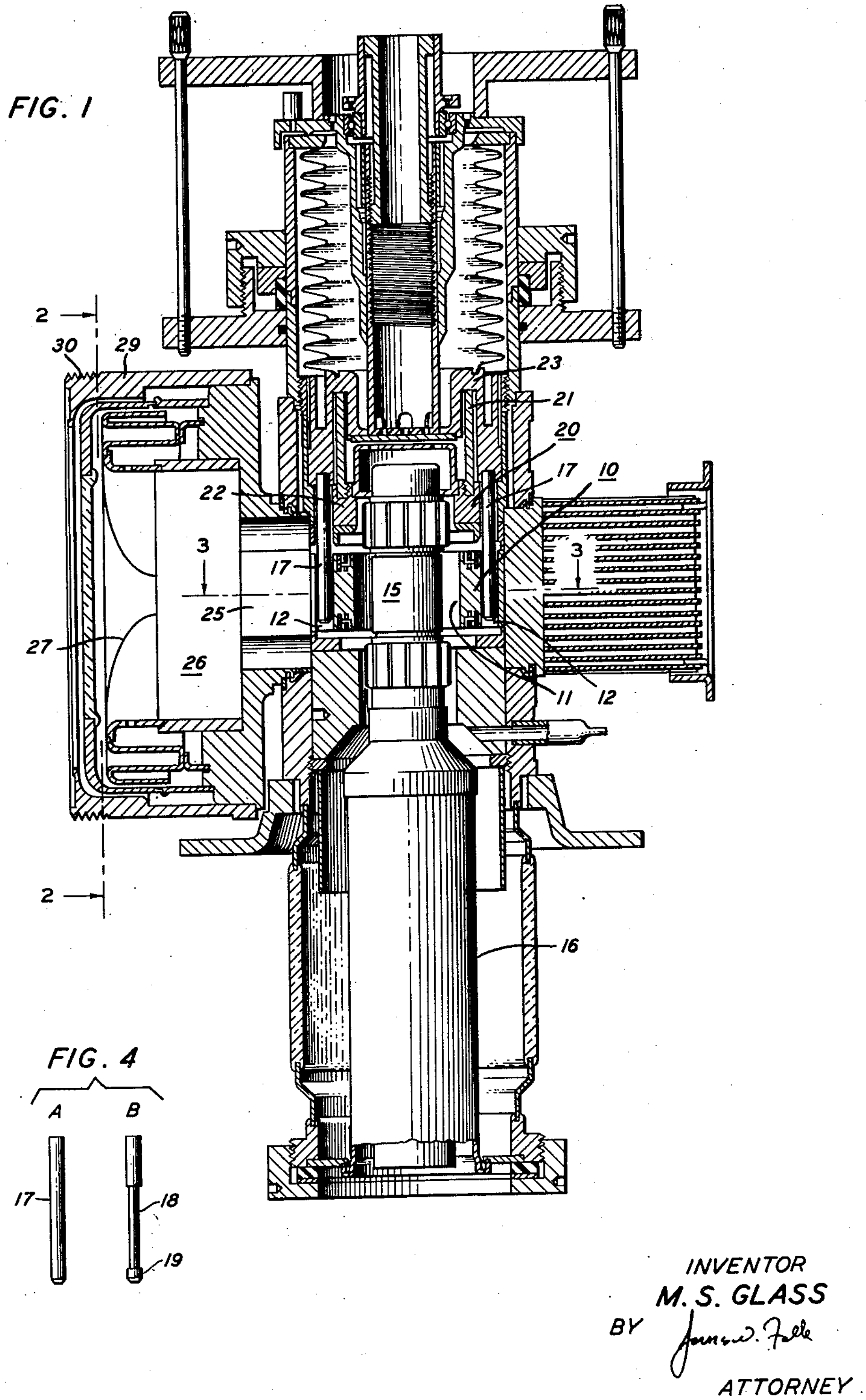
Fig. 1 is a sectional view of a magnetron in which this invention may be incorporated.
Fig. 4 shows views A and B of the tuning pins of the embodiment of Fig. 1.

Turning now to the drawing, the magnetron therein illustrated is of the type fully described in Patent 2,657,334, issued October 27, 1953 of J. W. West and comprises an anode 10 having an axial bore 11 and a plurality of cavity resonator bores 12 and 13 equally spaced in a circular array around the axial bore 11 and communicating therewith. A cathode 15 comprising a cylindrical sleeve having an electron emissive coating thereon is positioned within the axial bore 11 and supported by the supporting cylinder 16. Tuning pins 17 and 18, best seen in Figs. 4A and 4B and described further below, extend into the cavity resonator bores 12 and 13 and are axially insertable therein by a tuning mechanism 20. A cylindrical tuning head choke 21 is mounted by the pole piece 22 and cooperates with the tuning pin carrier member 23 to prevent power loss into the tuning head cavities, as more fully described in the above mentioned West patent.

Figure 2:
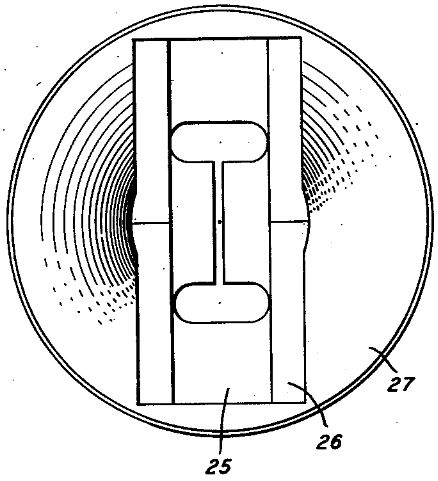
Fig. 2 is a plan view of the output transformer of the magnetron of Fig. 1 taken along line 2—2 of Fig. 1.

Energy from the magnetron is advantageously transmitted from one of the cavity resonator bores through a wave guide system comprising a first H-section or dumbbell shaped transformer 25, a second transformer 26, and a matching member 27, best seen in Fig. 2. The output dimensions of member 27 match the dimensions of the external wave guide which may be attached to a metallic coupling member 29 as by the threaded portion 30. Advantageously, the output transformer comprises these two steps between the slot of the H-section 25 and the wave guide dimensions to reduce the reactance variations of the transformer with frequency. The transformer is also advantageously of such dimensions as to introduce little or no reactance at the lowest frequency to be suppressed and has a sufficiently broad band characteristic so that the reactance increases only slowly with frequency.

Figure 3:
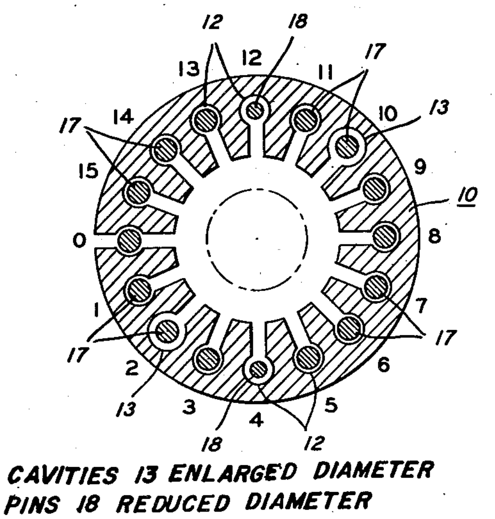
Fig. 3 is a sectional view of the anode of the magnetron and tuning pins taken along line 3—3 of Fig. 1, illustrating one specific embodiment of this invention.

Turning now to Fig. 3, there is shown a sectional view of the anode 10 of the specific illustrative embodiment of this invention depicted in Fig. 1. As can be seen, in this specific embodiment of this invention, the number of resonators in the resonant system is 16, and they have been numbered from 0, the output resonator, to 15. As the mode of oscillation closest in frequency to the desired $\pi$-mode is the 7-mode, the Nos. 2 and 10 resonator bores 13, located 45 and 225 degrees, respectively, from the output resonator, have been enlarged more nearly to equalize the loading of the doublet components of the 7-mode, as more fully described in the above-mentioned Fletcher-Millman application. The increase in diameter of the enlarged resonator bores 13 over the other equal dimensioned resonator bores 12 has been exaggerated for purposes of this exposition.

In accordance with this invention, the frequency variable reactance of the output transformer presented to the resonator system at the No. 0 output resonator bore is cancelled by the decreased diameter tuning pins 18 located in the Nos. 4 and 12 resonator bores 12 ninety degrees removed from the output resonator. The decrease in diameter of the tuning pins 18 from the tuning pins 17 insertable into the other resonator bores has similarly been exaggerated for purposes of clarity. In one specific illustrative embodiment wherein resonator bores 12 were .236 inch and the enlarged resonator bores 13 .250 inch, the diameter of tuning pins 17 was .182 inch and that of tuning pins 18 insertable into the Nos. 4 and 12 resonators .158 inch. Advantageously, a .150 inch length 19 of each of the pins 18 is left at the full diameter at their unsupported end as best seen in Fig. 4B. This larger portion at the end of the pins 18 has been found to be of aid in partially compensating for non-linearity of the reactance introduced by the output transformer and also to be helpful in lining up the two pins 18 in the assembly.

Figure 5:
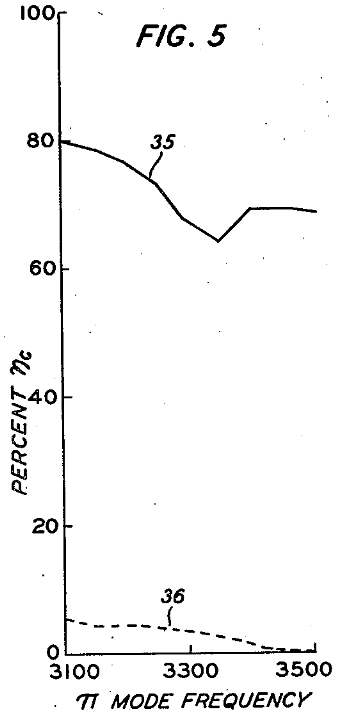
Fig. 5 is a graph depicting the percent loading, as measured by the percent circuit efficiency, for the doublet components of the mode closest to the $\pi$-mode for a resonant system in accordance with the prior art.
Figure 6:
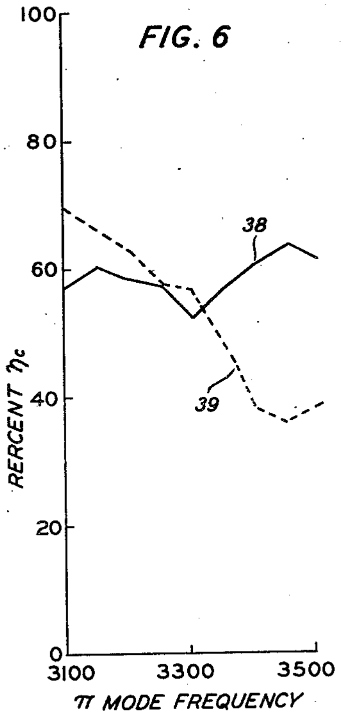
Fig. 6 is a graph depicting the percent loading for the doublet components of the mode closest to the $\pi$-mode for a resonant system in accordance with the teaching of the above-mentioned Fletcher-Millman application.
Figure 7:
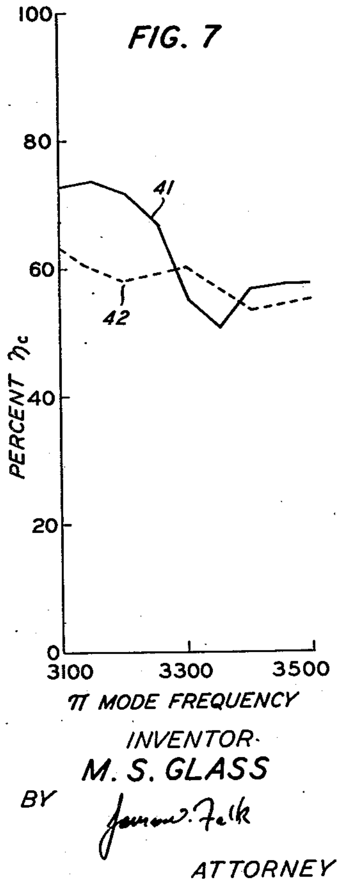
Fig. 7 is a graph depicting the percent loading for the doublet components of the mode closest to the $\pi$-mode for a resonant system in accordance with this invention.

The improvement in performance attained in accordance with this invention can be appreciated from a consideration of Figs. 5, 6, and 7, which are graphs of the degree of loading as expressed in the percent of circuit efficiency for the doublet components of the 7-mode, identified as **7*a* and 7*b* with the component 7*a* being the lower frequency component, plotted against the $\pi$-mode frequency for a sixteen resonator magnetron. In Fig. 5, curve 35 represents the variation in loading of the 7*a* component with frequency and curve 36 the variation in the 7*b* component for the prior art structures wherein the resonator bores are all of equal dimensions and the tuning pins are each dimensionally equal. As can readily be seen, the 7*a* component is quite heavily loaded whereas the loading on the 7*b*** component is negligible, giving rise to a high probability of "moding" due to oscillations commencing in this component rather than in the desired $\pi$-mode.

Fig. 6 is a graph of the variations in the degree of loading of the **7*a* component, indicated by curve 38, and the 7*b* component, indicated by curve 39, for a magnetron in accordance with the teaching of the above-mentioned Fletcher-Millman application in which two of the resonator bores are of slightly larger diameter than the other bores, thereby introducing a reactive disturbance at suitable points in the ring of resonator bores to stabilize the standing wave patterns of the 7-mode. As pointed out in the Fletcher-Millman application, voltage wave maxima occur adjacent these enlarged bores for the particular mode of oscillation to be suppressed. As can be seen, there is approximately one frequency at which exact equal loading of the two components of the 7-mode will exist, at frequencies lower than this match frequency, the 7*a* component is more heavily loaded than the 7*b* component and at frequencies higher than this match frequency, the 7*b*** component is more heavily loaded.

Turning now to Fig. 7, there is set forth a graph of the variations in the degree of loading of the two components of the 7-mode for the specific illustrative embodiment of this invention described above wherein the tuning pins insertable into the resonator bores 90 degrees removed from the output resonator were of decreased diameter, thereby introducing a frequency dependent reactance adjusted to cancel out the small reactance variations introduced by the output transformer as the frequency is increased. Curve 41 represents the degree of loading of the **7*a* component, and curve 42 represents the degree of loading of the 7*b*** component. As can be seen, the degree of loading of the doublet components is within tolerable limits of equivalency over the entire desired frequency range of operation.

While Figs. 5, 6, and 7 have been discussed above with reference to the specific illustrative embodiment depicted in Figs. 1, 2, and 3, for which data was taken for the graphs of Figs. 5, 6, and 7, it is, of course, to be understood that this invention is not limited to any particular type of resonant circuit nor to any number of resonators therein. Thus, in the specific embodiment described, the mode closest to the $\pi$-mode, and thus the mode most advantageously to be suppressed if moding is to be prevented, is the 7-mode as the resonant circuit comprised sixteen resonators. However, the practice of the principles of this invention in eliminating or compensating for the frequency variations of an output inductance associated with the output resonator is not limited to equalization of the loading of the doublet components of a particular mode of oscillation.

Further, while this invention has been described with reference to an embodiment in which decreased diameter tuning pins were insertable into both resonators substantially 90 degrees removed from the output resonator, compensation of the frequency variable output inductance can be attained in accordance with this invention by the employment of just one reduced diameter tuning pin in a resonator substantially 90 degrees removed from the output resonator. However, tuning pins are advantageously inserted into both such resonators so that the tuning discrepancy in any one resonator is not large and particularly is not sufficiently large to interfere with proper tuning of the desired $\pi$-mode of oscillation.

Thus, numerous other arrangements may be devised by those skilled in the art without departing from the spirit and scope of this invention.

Reference is made to application Serial No. 348,218, filed April 13, 1953, of J. P. Molnar, wherein a related invention is described.

What is claimed is:

1. A magnetron comprising conductive means defining a plurality of resonant cavities arranged in an array, wave guide means for removing energy from one of said cavities, said wave guide means including impedance transforming means, and a tuning pin insertable into each of said cavities to tune said magnetron, each of said tuning pins being of equal dimensions except for said tuning pins insertable into said bores approximately 90 degrees removed from said one bore which are of smaller dimensions to compensate for the frequency variable reactance introduced by said impedance transforming means.

2. A magnetron comprising a conductive member having a central aperture and a plurality of bores therethrough, said bores each communicating with said central aperture and being arranged in a circle therearound, means for removing energy from one of said bores, each of the bores being of the same dimensions except for two bores spaced from said one bore such that standing wave voltage maxima occur at said two bores for a particular mode of oscillation of said magnetron to be suppressed, and a tuning pin insertable into each of said bores, each of said pins being of the same dimensions except for said pins insertable into two other of said bores, said two other bores being substantially 90 degrees removed from said one bore.

3. A resonant circuit comprising a conductive member having a central aperture and a plurality of cavities therein, said cavities each communicating with said central aperture and arranged in a circle therearound, wave guide means for removing energy from one of said cavities, each of said cavities being of the same dimensions except for two cavities spaced from said one cavity such that standing wave voltage maxima occur at said two cavities for a particular mode of oscillation of said resonant circuit to be suppressed, and a tuning pin insertable into each of said cavities, each of said pins being of the same diameter except for said pins insertable into two other of said cavities approximately 90 degrees removed from said one cavity, said two pins being of smaller diameter to compensate for the frequency variable reactance introduced to said resonant circuit by said wave guide means.

4. A resonant circuit in accordance with claim 3 wherein said wave guide means comprises a plurality of impedance transforming means to reduce the reactance introduced thereby to said resonant circuit.

5. A resonant circuit in accordance with claim 3 wherein the unsupported ends of said two pins are of larger diameter than the main portion of said two pins.

6. A magnetron comprising an anode member having a central aperture and a plurality of resonator cavities therein, each of said cavities communicating with said central aperture and being arranged in a circle therearound, a cathode in said central aperture, wave guide means for removing energy from one of said cavities, said wave guide means comprising impedance transformer means, each of said cavities being of equal dimensions except for two cavities spaced from said one cavity such that standing wave voltage maxima occur adjacent said two cavities for a particular mode of oscillation of said magnetron to be suppressed, and a tuning pin insertable into each of said cavities, each of said pins being of the same diameter except for at least one of said pins insertable into said cavities substantially 90 degrees removed from said one cavity, said one pin being of smaller diameter to compensate for the variations with frequency of the reactance introduced to said magnetron by said transformer means.

7. A magnetron in accordance with claim 6 wherein the unsupported end of said one pin is of larger diameter than the central portion thereof.

References Cited in the file of this patent

UNITED STATES PATENTS

| | | |
|---|---|---|
| 2,653,276 | Crawford | Sept. 22, 1952 |
| 2,657,334 | West | Oct. 27, 1953 |